Figure 3:
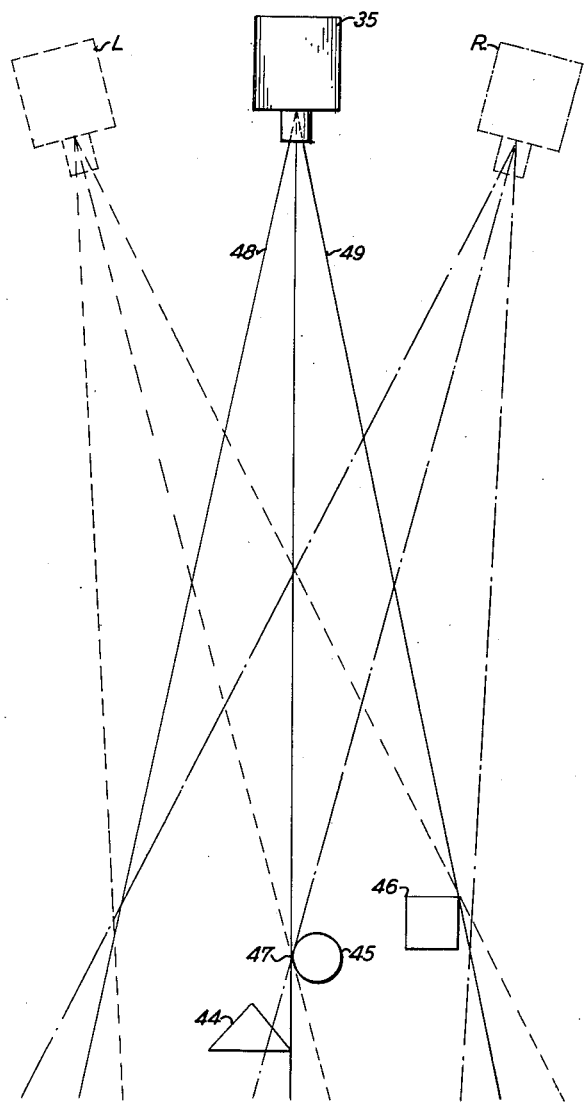

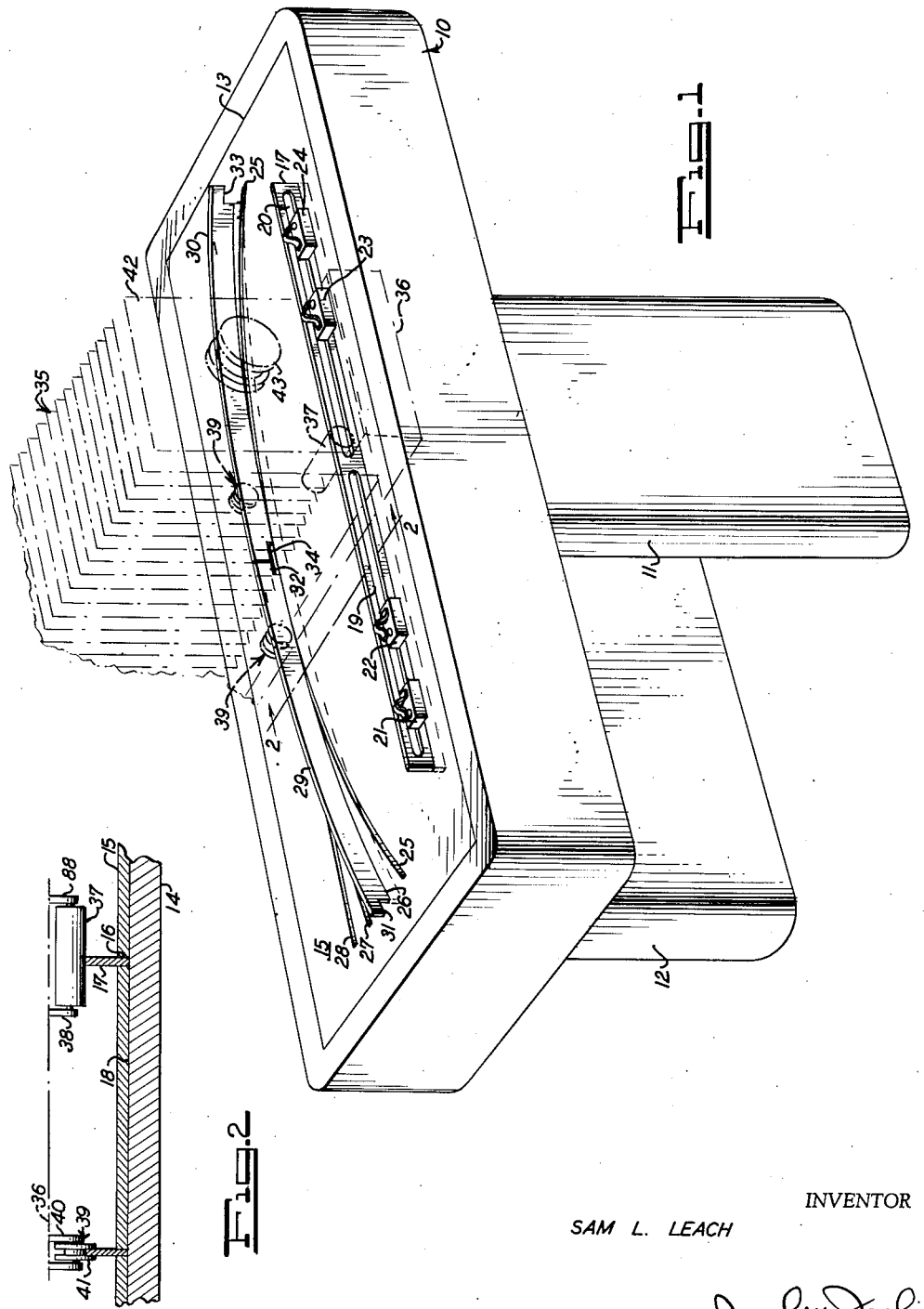

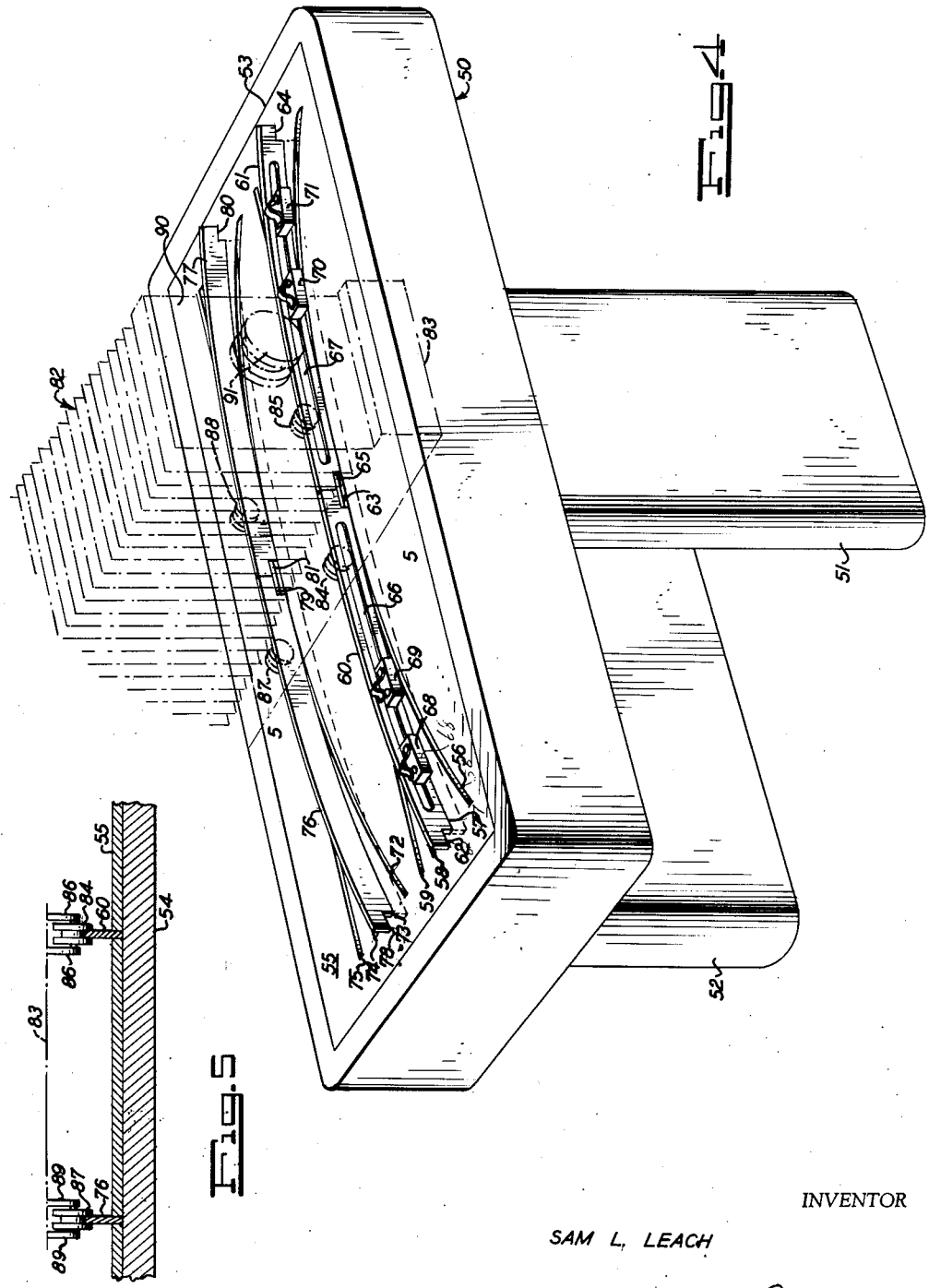

United States Patent Office 3,037,441
Patented June 5, 1962

3,037,441
TRAVERSING CAMERA MOUNT PROVIDING VARIABLE ARCUATE PATHS OF TRAVEL
Sam L. Leach, Beverly Hills, Calif., assignor to Tennessee Pictures, Inc., Elizabethton, Tenn., a corporation of Tennessee
Filed Oct. 12, 1960, Ser. No. 62,129
12 Claims. (Cl. 95—86)

This invention relates to photography and more particularly to a mount for a camera utilized in taking three dimensional pictures and in which means is provided for permitting traverse of the camera from side to side in an arcuate path, the radius of which may be varied as desired. This application is a continuation-in-part of my co-pending application Serial No. 582,502, filed May 3, 1956.

In the making of three dimensional photographs, it has been customary to arrange a group of subjects or a single subject as desired and to then move a camera along a fixed arcuate path at a predetermined distance from a single subject or a predetermined distance from a point located in the midst of a group of subjects and exposing a series of pictures as the camera travels which will provide a picture when properly viewed having three dimensional or stereoscopic properties. This manner of taking three dimensional pictures is, however, extremely limited, in that the camera is only capable of being moved along a single predetermined arcuate path and consequently, the distance between the camera and the subject or subjects cannot be varied and the possible arrangements and effects are consequently extremely limited. Lenses of different characteristics may, of course, be used, but this does not provide as versatile a system as would be provided were it possible to vary the radius of the arc along which the camera is moved which permits placing the camera at different distances from the subject or subjects and with an arrangement such as this in conjunction with the utilization of different lenses a three dimensional camera system is provided which is suitable for use in connection with a wide variety of photographic applications.

It is accordingly an object of the invention to provide a traversing camera mount which may be conveniently and economically constructed from readily available materials and which will serve to support any conventional camera utilized for the taking of three dimensional pictures and in which means is provided for varying the curvature of the path through which the camera travels during a picture taking sequence.

A further object of the invention is the provision of a traversing camera mount which may be utilized to support a conventional camera for taking three dimensional pictures and in which any suitable means and control mechanism may be utilized for producing traversing movements of such camera.

A still further object of the invention is the provision of a traversing camera mount for supporting a conventional camera utilized for taking three dimensional pictures and in which the camera is supported on spaced rails with one rail being straight and the other rail being curved with the curvature of such latter rail being variable to change the curvature of the path of travel of the camera.

Another object of the invention is the provision of a traversing camera mount for supporting and permitting movement of a camera in an arcuate path with the camera supported on a straight front rail and a curved rear rail and in which the rear rail comprises two flexible parts selectively received in a plurality of curved slots with each slot having a different radius.

A further object of the invention is the provision of a traversing camera mount providing rails for supporting a camera for traversing movement in an arcuate path, the supporting means including an arcuate flexible rail formed in two parts and selectively received in arcuate slots in the mount and in which one part of the rail may be moved to another slot, while the camera rests on the other part of the rail.

A still further object of the invention is the provision of a traversing camera mount for supporting a conventional camera utilized for taking three dimensional pictures and in which the camera is supported on spaced curved rails with the curvature of the rails being variable to change the curvature of the path of travel of the camera.

Another object of the invention is the provision of a traversing camera mount for supporting and causing movement of a camera in an arcuate path with the camera supported on a curved front rail and a curved rear rail and in which the front and rear rails each comprise two flexible parts selectively received in a plurality of curved slots with each slot having a different radius.

A further object of the invention is the provision of a traversing camera mount providing spaced rails for supporting a camera for traversing movement in an arcuate path, each rail being flexible and formed in two parts and selectively received in arcuate slots in the mount and in which one part of each rail may be moved to another slot while the camera is supported on the other part of each rail.

Further objects and advantages of the invention will be apparent from the following description taken in conjunction with the accompanying drawing wherein:

FIG. 1 is a view in perspective showing a camera mount constructed in accordance with this invention and with a portion of a camera mounted thereon shown in dotted outline;

FIG. 2 a fragmentary sectional view taken substantially on the line 2—2 of FIG. 1;

FIG. 3 a diagrammatic view showing the operation of the traversing camera mount of this invention;

FIG. 4 a view in perspective similar to FIG. 1 and showing a modified form of camera mount utilizing spaced curved flexible rails; and FIG. 5 a fragmentary sectional view taken substantially on the line 5—5 of FIG. 4.

With continued reference to the drawing, there is shown a traversing camera mount constructed in accordance with this invention and which may well comprise a base 10 mounted on pedestals or other suitable supporting means 11 and 12. The base 10 may be of generally rectangular configuration and may be provided with an upwardly opening recess 13 in which is secured a panel 14 of any suitable material, such as plywood and fixed to the upper surface of the panel 14 is a metallic plate 15, but if desired, such plate may be made of other suitable materials which will provide sufficient rigidity and strength for the purposes of this invention.

The plate 15 may be provided with a straight front slot 16 in which is removably disposed a straight front rail 17. As will be seen from an inspection of FIG. 2, the rail 17 is disposed in the slot 16 and contacts the upper surface 18 of the panel 14 in order to maintain the rail 17 projecting above the upper surface of the plate 15, as clearly shown in FIGS. 1 and 2. The rail 17 may be provided with slots 19 and 20 for adjustably receiving micro-switches 21, 22, 23 and 24, which are utilized for controlling the traversing movements of the camera supported on the mount of this invention. These micro-switches or the traversing mechanism form no part of the instant invention and consequently, no further detailed description thereof is included. The micro-switches are shown and described only for the purpose of showing the function of the front rail 17 in supporting the forward part of the camera and also for providing an adjustable support for such micro-switches. Of course, other controlling means may be substituted for the micro-switches where necessary or desirable.

Spaced rearwardly of the front slot 16 are a plurality of arcuate rear slots 25, 26, 27 and 28, and while four such slots are shown, it is to be understood that any desired number of slots may be utilized in order to provide the proper movement of the camera and, of course, if necessary or desirable, a plurality of plates 15 may be provided, each plate having a different arrangement of arcuate slots and one plate substituted for another in order to satisfy the problems encountered during a particular photographic application.

A pair of flexible rear rails 29 and 30 are shown inserted in the slot 26 and it is to be understood, that the rails 29 and 30 may be selectively inserted in any of the arcuate slots 25, 26, 27 and 28. It will be noted, that the rails 29 and 30 are of a length substantially equal to one-half the length of each of the arcuate slots and that consequently, the rail 29, for instance, could be removed from the slot 26 and inserted in the slot 28 and thereafter the rail 30 removed from the slot 26 and inserted in the slot 28. The purpose of making the rear rail in two parts will be later described in connection with the operation of the device. The rear rail 29 is provided with notches 31 and 32 at opposite ends thereof and likewise, the rear rail 30 is provided with notches 33 and 34 at opposite ends thereof. These notches in both of the rails 29 and 30 are provided to facilitate insertion of a screwdriver or other implement which may be conveniently utilized to lift either the rail 29 or 30 from the slot in which the same is disposed in order to permit insertion of such rails in another selected slot.

A portion of the camera is shown in dotted outline at 35 and such camera may be of any conventional type suitable for the purpose intended. The camera 35 is provided on the base 36 thereof with an elongated front supporting roller 37 which as shown in FIG. 2, may be rotatably mounted on ears 38 depending from the base 36, but of course, if desired, the roller 37 could as well be rotatably mounted in a recess in the base 36 with merely a portion of the roller projecting below the lower surface thereof. A pair of rear supporting rollers 39 may be rotatably mounted on ears 40 or other suitable means attached to the base 36 of the camera 35 and it is to be noted, that the rear rollers 39 are provided with flanges 41 for a purpose to be presently described.

As will be seen from an inspection of FIGS. 1 and 2, the camera 35 is supported on the mount of this invention for traversing movement by the front roller 37 engaging the upper surface of the straight front rail 17 and by the flanged rear rollers 39 engaging the arcuate rear tracks or rails 29 and 30. The flanges 41 on the rear rollers 39 serve to engage opposite sides of the rails 29 and 30 thereby preventing movement of the camera transversely of the rails 29 and 30 and insuring that movement of the camera longitudinally of the rails 29 and 30 will be in a path coinciding with the curvature of such rails.

The camera 35 may, of course, be provided with a suitable lens board 42 and interchangeable lenses 43 and it is, of course understood, that suitable shutter mechanism would also be supplied. No detailed description of the camera is included herein, since the same forms no part of this invention and any conventional camera which is suitable for the purpose intended may be employed with the mount of this invention.

The operation of the traversing camera mount of this invention is diagrammtically shown in FIG. 3, in which a plurality of subjects 44, 45 and 46 to be photographed may be arranged in any desired manner and, of course, a single subject or any desired number of subjects may be employed provided the same are arranged within the field of view of the particular camera lens employed and also keeping in mind the fact that the distance from the subjects to the camera may be varied by utilizing the mount of this invention, and at the same time, provide the desired traversing movement of the camera in order to accomplish the desired results. Heretofore, cameras utilized for this purpose have been fixed insofar as the distance between the camera and the subject or subjects is concerned, and consequently, the arrangement of such subjects was limited, since the same must be maintained within the field of view and, of course, since this field of view changes as the camera is moved toward or away from the subjects, assuming that the same lens is employed, it will be seen that by this invention there has been provided a means whereby the versatility of the system is greatly increased.

In the arrangement shown in FIG. 3, the camera 35 may be positioned at any desired distance from the subects 44, 45 and 46, this distance being determined by the desired arrangement of the subjects, as well as the particular lens employed and there may be selected arbitrarily a point 47 which may be substantially centrally of the subject arrangement or at any other desired location and this arbitrary point 47 is utilized as a center about which the camera travels in an arcuate path during the picture taking operation. Since the distance between the point 47 and the camera 35 will vary for different situations, such distances are utilized as radii for providing the arcuate slots 25, 26, 27 and 28 in the plate 15, and as stated above, any desired number of such slots may be provided in order to provide a sufficient different number of radii in order to accommodate all anticipated picture taking conditions.

In taking a three dimensional photograph of the objects 44, 45 and 46 shown in FIG. 3, the camera 35 would start from a position L at the left, as seen in FIG. 3 and move on the traversing mount of this invention toward the right or position R as shown in FIG. 3 and the field of view as seen by the camera 35 during this traversing movement is diagrammatically shown by the lines 48 and 49. During this traversing movement, the camera 36 is operating to take a continuous series of exposures and consequently, the resulting film will contain a series of exposures showing the subjects 44, 45 and 46, as viewed from right to left from the camera position and during this traversing movement, the camera, of course, moves in an arc about the point 47. As a result, the film when properly viewed will show a picture of the subjects 44, 45 and 46 in a three dimensional or stereoscopic aspect.

When it is desired to traverse the camera 35 on a different radius it is only necessary to for instance, move the camera to the position L as shown in FIG. 3, at which time, the rear flexible rail 30 may be removed from the slot 25 and the camera 35 may be moved to the position R as shown in FIG. 3 and the rail 29 removed from the slot 26 and positioned in the same slot as the rail 30. The mount is then ready for proceeding with picture taking operations at the newly selected radius.

With particular reference to FIGS. 4 and 5 there is shown a modified form of traversing camera mount constructed in accordance with this invention and which may well comprise a base 50 mounted on pedestals or other suitable supporting means 51 and 52. The base 50 may be of generally rectangular configuration and may be provided with an upwardly opening recess 53 in which is secured a panel 54 of any suitable material, such as plywood and fixed to the upper surface of the panel 54 is a metallic plate 55, but if desired, such plate may be made of other suitable materials which will provide sufficient rigidity and strength for the purposes of this invention.

The plate 55 may be provided with a plurality of arcuate front slots 56, 57, 58 and 59 and while four such slots are shown, it is to be understood that any desired number of slots may be utilized in order to provide the proper movement of the camera and, of course, if necessary or desirable, a plurality of plates 55 may be provided, each plate having a different arrangement of arcuate slots and one plate substituted for another in order to satisfy the problems encountered during a particular photographic application.

A pair of flexible front rails 60 and 61 are shown inserted in the slot 57 and it is to be understood that the rails 60 and 61 may be selectively inserted in any one of the arcuate slots 56, 57, 58 or 59. It will be noted that the rails 60 and 61 are of a length substantially equal to one-half the length of each of the arcuate slots and that consequently, the rail 60, for instance, could be removed from the slot 57 and inserted in the slot 58 and thereafter the rail 61 removed from the slot 57 and inserted in the slot 58. The purpose of making the front rail in two parts will be later described. The front rail 60 is provided with notches 62 and 63 at opposite ends thereof and likewise, the front rail 61 is provided with notches 64 and 65 at opposite ends thereof. These notches in both of the rails 60 and 61 are provided to facilitate insertion of a screwdriver or other implement which may be conveniently utilized to lift either the rail 60 or 61 from the slot in which the same is disposed in order to permit insertion of such rail in another selected slot.

The front rails 60 and 61 may be provided with slots 66 and 67 for adjustably receiving micro-switches 68, 69, 70 and 71 which are utilized for controlling the traversing movements of the camera supported on the mount of this invention. These micro-switches or the traversing mechanism forms no part of the instant invention and consequently, no further detailed description thereof is included. The micro-switches are shown and described only for the purpose of showing the function of the front rails 60 and 61 in supporting the forward part of the camera and also for providing an adjustable support for such micro-switches. Of course, other controlling means may be substituted for the micro-switches where necessary or desirable.

Spaced rearwardly of the front slots 56, 57, 58 and 59 are a plurality of arcuate rear slots 72, 73, 74 and 75 and while four such slots are shown, it is to be understood that any desired number of slots may be utilized in order to provide the proper movement of the camera and, of course, if necessary or desirable, a plurality of plates 55 may be provided, each plate having a different arrangement of arcuate slots therein and one plate substituted for another in order to satisfy the problems encountered during a particular photographic application. It is further to be noted, that the curvature of the rear slots 72, 73, 74 and 75 are the same as the corresponding front slots 56, 57, 58 and 59.

A pair of flexible rear rails 76 and 77 are shown inserted in the slot 73 and it is to be understood that the rails 76 and 77 may be selectively inserted in any of the arcuate slots 72, 73, 74 or 75. It will be noted that the rails 76 and 77 are of a length substantially equal to one-half the length of each of the arcuate rear slots and that consequently, the rail 76, for instance, could be removed from the slot 73 and inserted in the slot 74 and thereafter, the rail 77 removed from the slot 73 and inserted in the slot 74. The purpose of making the rear rail in two parts will be later described. The rear rail 76 is provided with notches 78 and 79 at opposite ends thereof and likewise, the rear rail 77 is provided with notches 80 and 81 at opposite ends thereof. These notches in both of the rails 76 and 77 are provided to facilitate insertion of a screwdriver or other implement which may be conveniently utilized to lift either the rail 76 or 77 from the slot in which the same is disposed in order to permit insertion of such rails in another selected slot.

A portion of the camera is shown in dotted outline at 82 and such camera may be of any conventional type suitable for the purpose intended. The camera 82 is provided on the base 83 thereof with a pair of flanged front supporting rollers 84 and 85 which as shown in FIG. 5, may be rotatably mounted on ears 86 depending from the base 83, but, of course, if desired, the rollers 84 and 85 may be mounted in any other suitable manner. As shown in FIG. 5, the rollers 84 and 85 engage the upper surface of front rails 60 and 61. A pair of rear flanged rollers 87 and 88 are rotatably mounted on ears 89 or other suitable means attached to the base 83 of the camera 82 and as clearly shown in FIG. 5, the rear flanged rollers 87 and 88 engage the upper surface of the rear rails 76 and 77.

As will be seen from an inspection of FIGS. 4 and 5, the camera 82 is supported on the mount of this invention for traversing movement and due to the engagement of the flanged front rollers 84 and 85 with the front rails 60 and 61 and the engagement of the flanged rear rollers 87 and 88 with the rear rails 76 and 77, the movement of the camera will follow the arcuate path described by the front and rear rails and obviously, movement of the camera will be confined to such path.

The camera 82 may, of course, be provided with a suitable lens board 90 and interchangeable lenses 91 and it is, of course, understood that suitable shutter mechanism would also be supplied. No detailed description of the camera is included herein, since the same forms no part of this invention and any conventional camera which is suitable for the purpose intended may be employed with the mount of this invention.

The operation of the modified form of camera mount shown in FIGS. 4 and 5 is identical with that described above in connection with the first form of the invention, except that it is necessary to move the front rails 60 and 61 to different slots in the same manner as it is necessary to move the rear rails 76 and 77 in order to change the curvature of the path of movement of the camera during traversing operations thereof.

When it is desired to change the path of movement of the camera, it is only necessary to move the same to one side where it may be supported, for instance, on the rails 60 and 76 whereupon the rails 61 and 77 may be removed from the slots in which the same are disposed and inserted in other slots, after which the camera may be moved to the opposite side to be supported on the rails 61 and 77 and the rails 60 and 76 removed and inserted in the appropriate slots.

The movement of the camera 35 or camera 82 on the traversing mounts of this invention is not to be confused with the movement of a conventional panoramic camera, since in such a camera the same moves in an arcuate path about the nodal point of the objective lens which means that the optical axis of the camera traverses the subject being photographed, whereas in the instant case, the camera traverses an arc about a point fixed with relation to the subject or subjects and the optical axis of the camera does not move with relation to such point.

It will, therefore, be seen that by the above described invention there has been provided a relatively simple, yet highly effective traversing camera mount which may be utilized in the taking of three dimensional or stereoscopic pictures of one or more subjects arranged in any desired manner and in which the distance from the camera to such subject may be varied as desired in order to provide a universal photographic system applicable to any conditions normally encountered in such operations and at the same time, provide a means whereby the camera will follow an arcuate path during traversing movement thereof with such path determined by the distance from the camera to an arbitrary point selected with relation to the arrangement of the subject, there being also provided means to permit convenient change of the arcuate path followed by the camera as a result of changing the distance from the camera to the subjects. As described above, the arcuate path may be conveniently changed without removing the camera from the mount and also, if desired, suitable interchangeable plates having arcuate slots therein may be employed, or where practical, a single plate having the desired arrangement of slots may be utilized. The traversing mount of this invention may be utilized with any conventional camera without material modification thereof, except for providing suitable supporting rollers thereon and by utilizing this invention an extremely versatile three dimensional photographic system is provided.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A traversing camera mount comprising a base, a top panel on said base, a metallic plate fixed to the upper surface of said panel, a straight front slot in said plate, a front rail removably disposed in said front slot, said front rail being supported by said panel and projecting above said plate, a plurality of arcuate rear slots in said plate spaced rearwardly of said front slot, each rear slot having a different radius than each other rear slot, a pair of flexible rear rails selectively disposed in one of said rear slots, the flexibility of said rails permitting changing of the curvature to correspond to the selected slot, said rear rails being supported by said panel and projecting above said plate, each of said rear rails being of a length substantially equal to one-half of each rear slot and means adjacent each end of each rear rail to facilitate removal thereof from said rear slots whereby a camera having an elongated front roller and a pair of flanged rear rollers may be supported on said mount for arcuate traversing movement with said front roller engaging said front rail for longitudinal and transverse movement thereon, and said rear rollers engaging said rear rails for movement longitudinally thereof following the curvature of said rear rails to maintain the optical axis of the camera substantially perpendicular to a tangent at any point along said rear rails and irrespective of the curvature of said rear rails, said pair of rails being provided to permit shifting of one rail to another slot while said rear rollers are supported by the other rail.

2. A traversing camera mount comprising a base, a top panel on said base, a metallic plate fixed to the upper surface of said panel, a straight front slot in said plate, a front rail removably disposed in said front slot, said front rail being supported by said panel and projecting above said plate, a plurality of arcuate rear slots in said plate spaced rearwardly of said front slot, each rear slot having a different radius than each other rear slot and a pair of flexible rear rails selectively disposed in one of said rear slots, the flexibility of said rails permitting changing of the curvature to correspond to the selected slot, said rear rails being supported by said panel and projecting above said plate, each of said rear rails being of a length substantially equal to one-half the length of each rear slot whereby a camera having an elongated front roller and a pair of flanged rear rollers may be supported on said mount for arcuate traversing movement with said front roller engaging said front rail for longitudinal and transverse movement thereon and said rear rollers engaging said rear rails for movement longitudinally thereof following the curvature of said rear rails to maintain the optical axis of the camera substantially perpendicular to a tangent at any point along said rear rails and irrespective of the curvature of said rear rails, said pair of rails being provided to permit shifting of one rail to another slot while said rear rollers are supported by the other rail.

3. A traversing camera mount comprising a base, a top panel on said base, a metallic plate disposed on the upper surface of said panel, a straight front slot in said plate, a front rail removably disposed in said front slot, said front rail being supported by said panel and projecting above said plate, a plurality of arcuate rear slots in said plate spaced rearwardly of said front slot, each rear slot having a different radius than each other rear slot and a pair of flexible rear rails selectively disposed in one of said rear slots, the flexibility of said rails permitting changing of the curvature to correspond to the selected slot, said rear rails being supported by said panel and projecting above said plate whereby a camera having an elongated front roller and a pair of flanged rear rollers may be supported on said mount for arcuate traversing movement with said front roller engaging said front rail for longitudinal and transverse movement thereon and said rear roller engaging said rear rails for movement longitudinally thereof following the curvature of said rear rails to maintain the optical axis of the camera substantially perpendicular to a tangent at any point along said rear rails and irrespective of the curvature of said rear rails, said pair of rails being provided to permit shifting of one rail to another slot while said rear rollers are supported by the other rail.

4. A traversing camera mount comprising a base, a plate mounted on said base, a straight front slot in said plate, a front rail removably disposed in said front slot and projecting above said front plate, a plurality of arcuate rear slots in said plate spaced rearwardly of said front slot, each rear slot having a different radius than each other rear slot and a pair of flexible rear rails selectively disposed in one of said rear slots and projecting above said plate, the flexibility of said rails permitting changing of the curvature to correspond to the selected slot, whereby a camera having an elongated front roller and a pair of flanged rear rollers may be supported on said mount for arcuate traversing movement with said front roller engaging said front rail for longitudinal and transverse movement thereon and said rear rollers engaging said rear rails for movement longitudinally thereof following the curvature of said rear rails to maintain the optical axis of the camera substantially perpendicular to a tangent at any point along said rear rails and irrespective of the curvature of said rear rails, said pair of rails being provided to permit shifting of one rail to another slot while said rear rollers are supported by the other rail.

5. A traversing camera mount comprising a base, a plate mounted on said base, a straight front rail carried by said front plate, a plurality of arcuate rear slots in said plate spaced rearwardly of said front rail, each rear slot having a different radius than each other rear slot and a pair of flexible rear rails selectively disposed in one of said rear slots and projecting above said plate, the flexibility of said rails permitting the changing of the curvature to correspond to the selected slot, whereby a camera having an elongated front roller and a pair of flanged rear rollers may be supported on said mount for arcuate traversing movement with said front rail for longitudinal and transverse movement thereon and said rear rollers engaging said rear rails for movement longitudinally thereof following the curvature of said rear rails to maintain the optical axis of the camera substantially perpendicular to a tangent at any point along said rear rails and irrespective of the curvature of said rear rails, said pair of rails being provided to permit shifting of one rail to another slot while said rear rollers are supported by the other rail.

6. A traversing camera mount comprising a base, a plate mounted on said base, a straight front rail carried by said plate, a plurality of arcuate rear slots in said plate spaced rearwardly of said front rail, each rear slot having a different radius than each other rear slot and a flexible rear rail selectively disposed in one of said rear slots and projecting above said plate, the flexibility of said rear rail permitting changing of the curvature to correspond to the selected slot, whereby a camera having an elongated front roller and a pair of flanged rear rollers may be supported on said mount for arcuate traversing movement with said front roller engaging said front rail for longitudinal and transverse movement thereon and said rear rollers engaging said rear rail for movement longitudinally thereof following the curvature of said rear rail to maintain the optical axis of the camera substantially perpendicular to a tangent at any point along said rear rail and irrespective of the curvature of said rear rail.

7. A traversing camera mount comprising a base, a top panel on said base, a metallic plate fixed to the upper surface of said panel, a plurality of arcuate front slots in said plate, each front slot having a different radius than each other front slot, a pair of flexible front rails selectively disposed in one of said front slots, the flexibility of said front rails permitting changing of the curvature to correspond to the selected front slot, said front rails being supported by said panel and projecting above said plate, each of said front rails being of a length substantially equal to one-half of each front slot and means adjacent each end of each front rail to facilitate removal thereof from said front slots, a plurality of arcuate rear slots in said plate spaced rearwardly of said front slot, each rear slot having a different radius than each other rear slot, each rear slot having the same curvature as the corresponding front slot, a pair of flexible rear rails selectively disposed in one of said rear slots, the flexibility of said rear rails permitting changing of the curvature to correspond to the selected slot, said rear rails being supported by said panel and projecting above said plate, each of said rear rails being of a length substantially equal to one-half of each rear slot and means adjacent each end of each rear rail to facilitate removal thereof from said rear slots, whereby a camera having a pair of flanged front rollers and a pair of flanged rear rollers may be supported on said mount for arcuate traversing movement with said front and rear rollers engaging said front and rear rails for movement longitudinally thereof following the curvature of said front and rear rails to maintain the optical axis of the camera substantially perpendicular to a tangent at any point along said front and rear rails and irrespective of the curvature of said front and rear rails, said pairs of rails being provided to permit shifting of one rail of each pair to another slot while said front and rear rollers are supported by the other rail of each pair.

8. A traversing camera mount comprising a base, a top panel on said base, a metallic plate fixed to the upper surface of said panel, a plurality of arcuate front slots in said plate, each front slot having a different radius than each other front slot, a pair of flexible front rails selectively disposed in one of said front slots, the flexibility of said front rails permitting changing of the curvature to correspond to the selected front slot, said front rails being supported by said panel and projecting above said plate, each of said front rails being of a length substantially equal to one-half of each front slot, a plurality of arcuate rear slots in said plate spaced rearwardly of said front slots, each rear slot having a different radius than each other rear slot, each rear slot having the same curvature as the corresponding front slot, a pair of flexible rear rails selectively disposed in one of said rear slots, the flexibility of said rear rails permitting changing of the curvature to correspond to the selected slot, said rear rails being supported by said panel and projecting above said plate, each of said rear rails being of a length substantially equal to one-half of each rear slot, whereby a camera having a pair of flanged front rollers and a pair of flanged rear rollers may be supported on said mount for arcuate traversing movement with said front and rear rollers engaging said front and rear rails for movement longitudinally thereof following the curvature of said front and rear rails to maintain the optical axis of the camera substantially perpendicular to a tangent at any point along said front and rear rails and irrespective of the curvature of said front and rear rails, said pairs of rails being provided to permit shifting of one rail of each pair to another slot while said front and rear rollers are supported by the other rail of each pair.

9. A traversing camera mount comprising a base, a top panel on said base, a metallic plate fixed to the upper surface of said panel, a plurality of arcuate front slots in said plate, each front slot having a different radius than each other front slot, a pair of flexible front rails selectively disposed in one of said front slots, the flexibility of said front rails permitting changing of the curvature to correspond to the selected front slot, said front rails being supported by said panel and projecting above said plate, a plurality of arcuate rear slots in said plate spaced rearwardly of said front slots, each rear slot having a different radius than each other rear slot, each rear slot having the same curvature as the corresponding front slot, a pair of flexible rear rails selectively disposed in one of said rear slots, the flexibility of said rear rails permitting changing of the curvature to correspond to the selected slot, said rear rails being supported by said panel and projecting above said plate, whereby a camera having a pair of flanged front rollers and a pair of flanged rear rollers may be supported on said mount for arcuate traversing movement with said front and rear rollers engaging said front and rear rails for movement longitudinally thereof following the curvature of said front and rear rails to maintain the optical axis of the camera substantially perpendicular to a tangent at any point along said front and rear rails and irrespective of the curvature of said front and rear rails, said pairs of rails being provided to permit shifting of one rail of each pair to another slot while said front and rear rollers are supported by the other rail of each pair.

10. A traversing camera mount comprising a base, a plate mounted on said base, a plurality of arcuate front slots in said plate, each front slot having a different radius than each other front slot, a pair of flexible front rails selectively disposed in one of said front slots, the flexibility of said front rails permitting changing of the curvature to correspond to the selected front slot, said front rails projecting above said front plate, a plurality of arcuate rear slots in said plate spaced rearwardly of said front slots, each rear slot having a different radius than each other rear slot, each rear slot having the same curvature as the corresponding front slot, a pair of flexible rear rails selectively disposed one of said rear slots, the flexibility of said rear rails permitting changing of the curvature to correspond to the selected slot, said rear rails projecting above said plate, whereby a camera having a pair of flanged front rollers and a pair of flanged rear rollers may be supported on said mount for arcuate traversing movement with said front and rear rollers engaging said front and rear rails for movement longitudinally thereof following the curvature of said front and rear rails to maintain the optional axis of the camera substantially perpendicular to a tangent at any point along said front and rear rails and irrespective of the curvature of said front and rear rails, said pairs of rails being provided to permit shifting of one rail of each pair to another slot while said front and rear rollers are supported by the other rail of each pair.

11. A traversing camera mount comprising a base, a plate mounted on said base, a plurality of arcuate front slots in said plate, each front slot having a different radius than each other front slot, a flexible front rail selectively disposed in one of said front slots, the flexibility of said front rail permitting changing of the curvature to correspond to the selected front slot, said front rail projecting above said plate, a plurality of arcuate rear slots in said plate spaced rearwardly of said front slots, each rear slot having a different radius than each other rear slot, each rear slot having the same curvature as the corresponding front slot, a flexible rear rail selectively disposed in one of said rear slots, the flexibility of said rear rail permitting changing of the curvature to correspond to the selected slot, said rear rail projecting above said plate, whereby a camera having a pair of flanged front rollers and a pair of flanged rear rollers may be supported on said mount for arcuate traversing movement with said front and rear rollers engaging said front and rear rails for movement longitudinally thereof following the curvature of said front and rear rails to maintain the optical axis of the camera substantially perpendicular to a tangent at any point along said front and rear rails and irrespective of the curvature of said front and rear rails.

12. A traversing camera mount comprising a base, a plate mounted on said base, a front rail carried by said plate, a rear rail carried by said plate and means to vary the curvature of one of said rails, whereby a camera having flanged rollers engaging the variable-curvature rail may be supported on said mount for arcuate traversing movement with said flanged rollers engaging said variable curvature rail for movement longitudinally thereof following the curvature of said variable curvature rail to maintain the optical axis of the camera substantially perpendicular to a tangent at any point along said variable-curvature rail and irrespective of the curvature of such rail.

References Cited in the file of this patent

UNITED STATES PATENTS

| | | |
|---|---|---|
| 1,312,675 | Beyer | Aug. 12, 1919 |
| 2,158,660 | Kanolt | May 16, 1939 |
| 2,386,276 | Simjian | Oct. 9, 1945 |